Dec. 2, 1924.

A. FRANÇOIS

VENTILATING FAN DRIVE

Filed July 5, 1923     2 Sheets-Sheet 1

1,517,623

INVENTOR.
Alphonse François
BY Wooster & Davis
ATTORNEYS.

Dec. 2, 1924. 1,517,623
A. FRANÇOIS
VENTILATING FAN DRIVE
Filed July 5, 1923   2 Sheets-Sheet 2

INVENTOR.
Alphonse François
BY Wooster & Davis
ATTORNEYS.

Patented Dec. 2, 1924.

1,517,623

UNITED STATES PATENT OFFICE.

ALFONSE FRANÇOIS, OF BRIDGEPORT, CONNECTICUT, ASSIGNOR TO RINGLING BROTHERS, OF BRIDGEPORT, CONNECTICUT, A FIRM CONSISTING OF CHARLES RINGLING, JOHN RINGLING, AND RICHARD T. RINGLING.

VENTILATING-FAN DRIVE.

Application filed July 5, 1923. Serial No. 649,708.

*To all whom it may concern:*

Be it known that I, ALFONSE FRANÇOIS, a citizen of the Republic of France, residing at Bridgeport, county of Fairfield, State of Connecticut, have invented a new and useful Ventilating-Fan Drive, of which the following is a specification.

This device relates to a ventilating mechanism, and has for an object to provide improved, simple and reliable means for automatically changing the direction in which the air is directed by ventilating fans.

With the foregoing and other objects in view I have devised the construction illustrated in the accompanying drawings, in which—

Figures 1, 2:
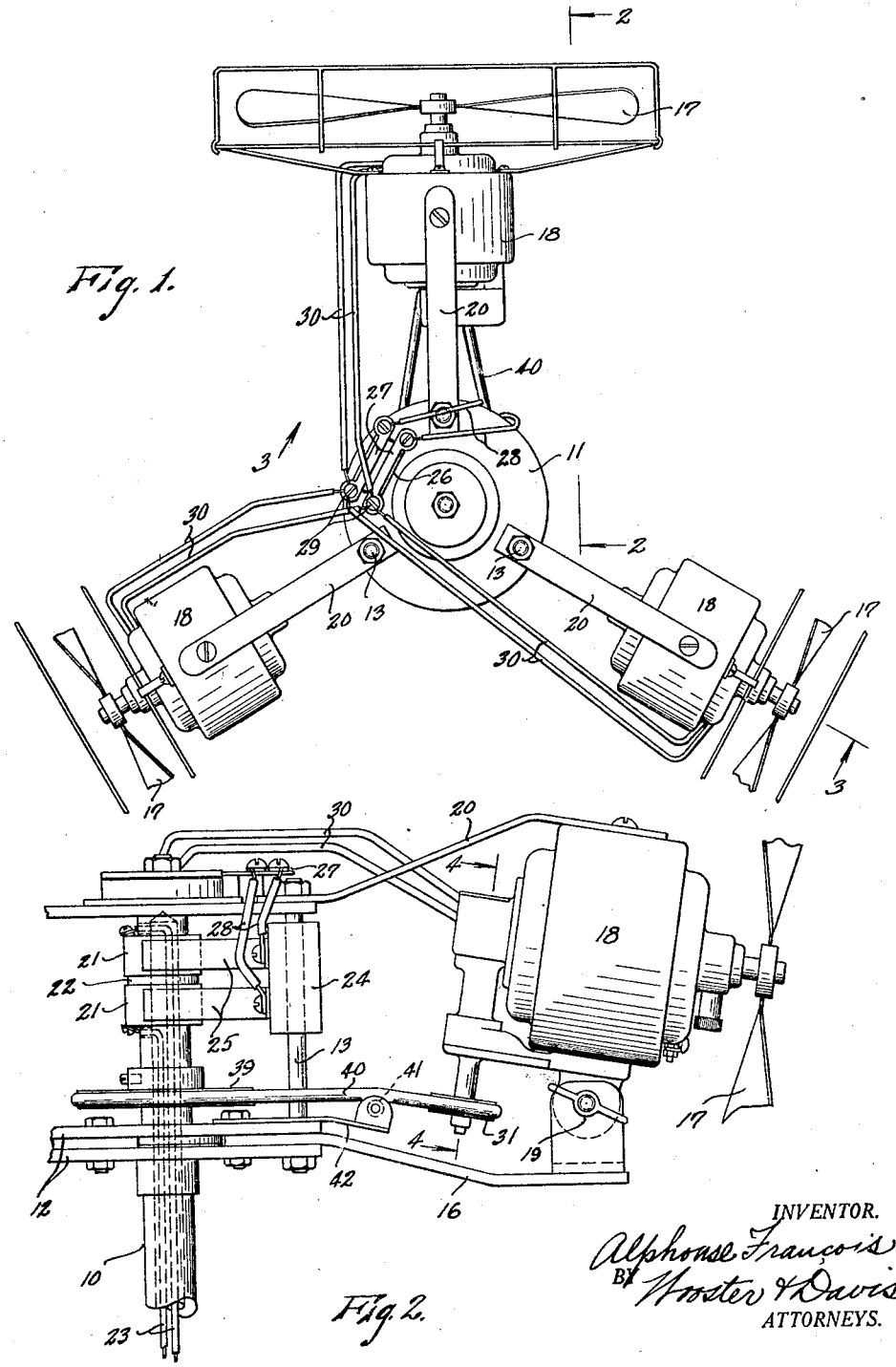
Fig. 1 is a top plan view of the device.
Fig. 2 is a partial side elevation thereof substantially on line 2—2 of Fig. 1.
Figure 3:
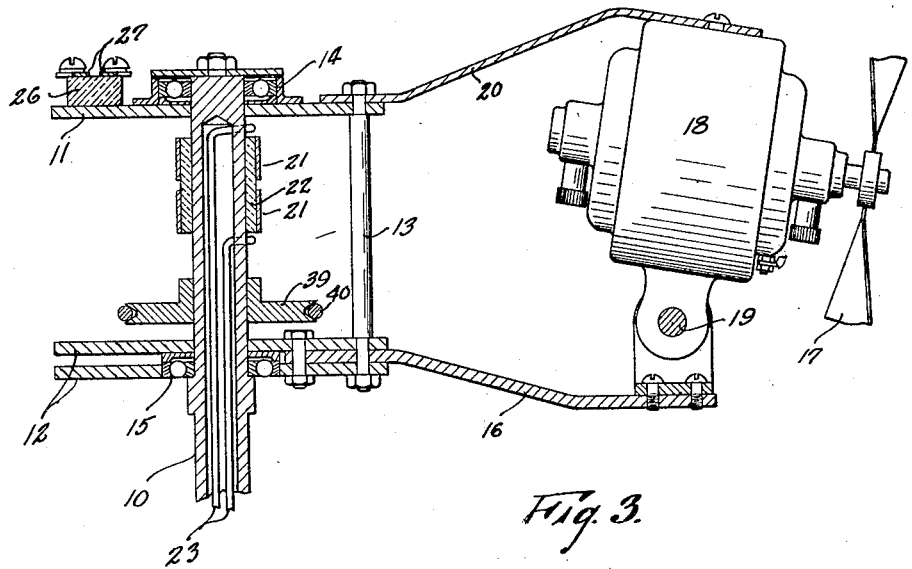
Fig. 3 is a partial transverse section substantially on line 3—3 of Fig. 1.
Figure 4:
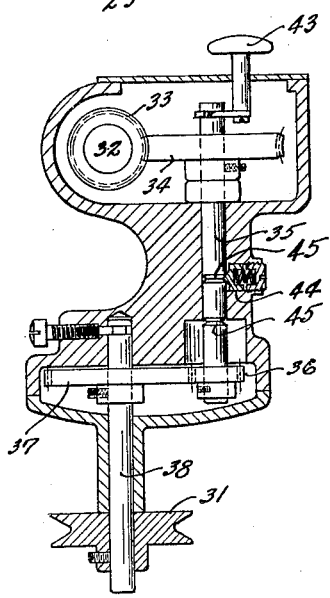
Fig. 4 is a detail sectional view substantially on line 4—4 of Fig. 2.

The device comprises a stationary support 10 which may be mounted in any suitable manner, not shown. Mounted to rotate on this stationary support is a rotatable fan support. This fan support may be of different constructions, that shown comprises a pair of upper and lower plates 11 and 12 respectively connected in suitable spaced relation by shouldered bolts 13, and between these plates and the stationary support are suitable ball-bearings 14 and 15. Carried by these plates, in the present embodiment by suitable radially projecting supporting elements 16, are any number of electrical fans 17 and their driving motors 18, these fans being preferably of a conventional type having the adjustable pivotal supports 19, and are braced to the upper plate 11 by suitable straps 20. I have shown three of these fans in the present embodiment, all directed to project air radially outwardly from the stationary support, but it will, of course, be understood that any number of fans may be used as desired. They are also preferably directed slightly downwardly, as shown in Figs. 2 and 3, but they may, of course, be directed as desired.

For the purpose of leading the electric current to the motors from a source of current supply, a pair of spaced rings 21 are mounted on an insulating sleeve 22 carried by the stationary support 10, and these rings are connected to any suitable source of current supply by the electrical conducting wires 23 passing up through a central passage in the stationary support. Carried by the rotatable fan support, preferably on one of the bolts 13, is an insulating block 24 upon which are mounted a pair of brushes 25 engaging the rings 21. Mounted upon the upper plate 11 is an insulating distributing block 26 upon which are mounted a pair of contact plates 27, and these plates are connected with the brushes 25 by suitable electrical connections 28. The plates 27 are provided with suitable binding posts 29 from which conducting wires 30 are led to the respective fan motors so that each is independently operated.

One of these motors, however, is employed to rotate the fan support and with it all the fans, so that the air thrown outwardly by these fans is directed in all directions by their movement about the stationary support, thus giving a continuous agitation of the air in all directions. For this purpose a drive pulley 31 is rotated by a suitable train of gearing from one of the fan motors. I have shown on one of the motor shafts 32 a worm 33 meshing with a worm gear 34 on a shaft 35 which carries a small pinion 36 meshing with a gear 37 on the shaft 38 to which the pulley 31 is connected. This is a reducing gearing so that the pulley is rotated much more slowly than the motor shaft. Mounted on the stationary support is a larger stationary pulley 39 with a belt 40 connecting the two, and it will be apparent that as the pulley 31 is rotated by the motor the coaction of the belt with this pulley and the stationary pulley will slowly rotate the fan support. For the purpose of properly guiding the belt and keeping it properly taut, suitable guide rollers 41 are preferably provided on a spring support 42 carried by the fan support.

Suitable means may be provided for disconnecting the drive from the motor to the pulley 31. For this purpose the shaft 35 may be mounted to slide vertically through a hand operated knob or button 43 and move the worm gear 34 out of mesh with worm 33 and pinion 36 out of mesh with gear 37. It is retained in these two positions by suitable means, such as a spring operated plunger 44 having a projection extending into spaced grooves in the shaft.

From the foregoing description it will be apparent that a single driving means from one of the fan motors may be used to rotate the support for any desired number of fans, and that all these fans will be operated from a single source of current supply. It will also be apparent that the driving mechanism for the fan support is very simple in construction and so will be reliable in operation and will not be likely to be easily gotten out of order. As all the fans are bodily rotated slowly about a given axis, they each in a single rotation project air radially in all directions from this axis, thus giving a very thorough circulation and agitation of the surrounding air. This device is well adapted for agitating the air in large enclosures, as for example, circus tents.

Having thus set forth the nature of my invention, what I claim is:

1. In a device of the character described, an upright support, spaced bearings carried by the support, spaced plates connected by the rods, bearings carried by said plates co-operating with the bearings carried by the support, outwardly extending arms carried by said plates, fans and motors for operating the fans secured to said arms, the motors and fans being equally spaced about said support, a stationary pulley mounted on the support between the plates, a pulley connected to one of the fan motors and driven thereby, and a driving belt connecting said pulleys.

2. In a device of the character described, an upright tubular support, a pair of spaced bearings carried by said support, spaced supporting plates, tie rods connecting said plates, bearings carried by said plates co-operating with the bearings carried by the supports, outwardly extending arms carried by the plates and equally spaced about the support, fans and driving motors therefor carried by the arms, a stationary pulley carried by the support between the plates, a pulley connected to one of the fan motors and driven thereby, a driving belt connecting said pulleys, insulated metal rings carried by the support, contact brushes carried by the plates and engaging said rings, connections from said brushes to the motors, and connections from a source of current supply extending through said tubular support to the rings.

In testimony whereof I affix my signature.

ALFONSE FRANÇOIS.